United States Patent [19]

Pluequet

[11] Patent Number: 4,463,709
[45] Date of Patent: Aug. 7, 1984

[54] EXHAUST GAS CONDUIT SYSTEM FOR MULTI-CYLINDER RECIPROCATING PISTON INTERNAL COMBUSTION ENGINES

[75] Inventor: Heinz Pluequet, Cologne, Fed. Rep. of Germany

[73] Assignee: Klöckner-Humboldt-Deutz Aktiengesellschaft, Cologne, Fed. Rep. of Germany

[21] Appl. No.: 225,338

[22] Filed: Jan. 15, 1981

Related U.S. Application Data

[62] Division of Ser. No. 948,438, Oct. 4, 1978, Pat. No. 4,273,080.

[30] Foreign Application Priority Data

Oct. 6, 1977 [DE] Fed. Rep. of Germany ....... 2744964

[51] Int. Cl.$^3$ .............................................. F01P 11/20
[52] U.S. Cl. .................................. 123/41.5; 123/41.31; 60/321
[58] Field of Search ........................... 123/41.31, 41.5; 60/320, 321

[56] References Cited

U.S. PATENT DOCUMENTS

| | | | |
|---|---|---|---|
| 2,067,253 | 1/1937 | Wohanka | 60/321 |
| 2,423,574 | 7/1947 | Barrett | 60/321 |
| 2,886,945 | 5/1959 | Hofer | 60/321 |
| 3,261,337 | 7/1966 | Muller | 123/41.31 |
| 3,324,533 | 6/1967 | Watteau | 123/41.31 |
| 4,205,527 | 6/1980 | Rudert et al. | 60/321 |

Primary Examiner—Craig R. Feinberg
Assistant Examiner—W. R. Wolfe
Attorney, Agent, or Firm—Becker & Becker, Inc.

[57] ABSTRACT

An exhaust gas conduit system for a multi-cylinder reciprocable piston internal combustion engine having its cylinders arranged in at least one cylinder row and provided with a cylinder head having an exhaust manifold connected thereto; exhaust gas conduits establish communication between the respective cylinder and the pertaining cylinder head and are respectively surrounded by the water cooled insulating walls. Each of the water cooled insulating walls along the pertaining exhaust gas conduit is provided with longitudinal water chambers formed by wall portions of the insulating wall and by ribs supporting the water chamber forming wall portions relative to each other.

5 Claims, 5 Drawing Figures

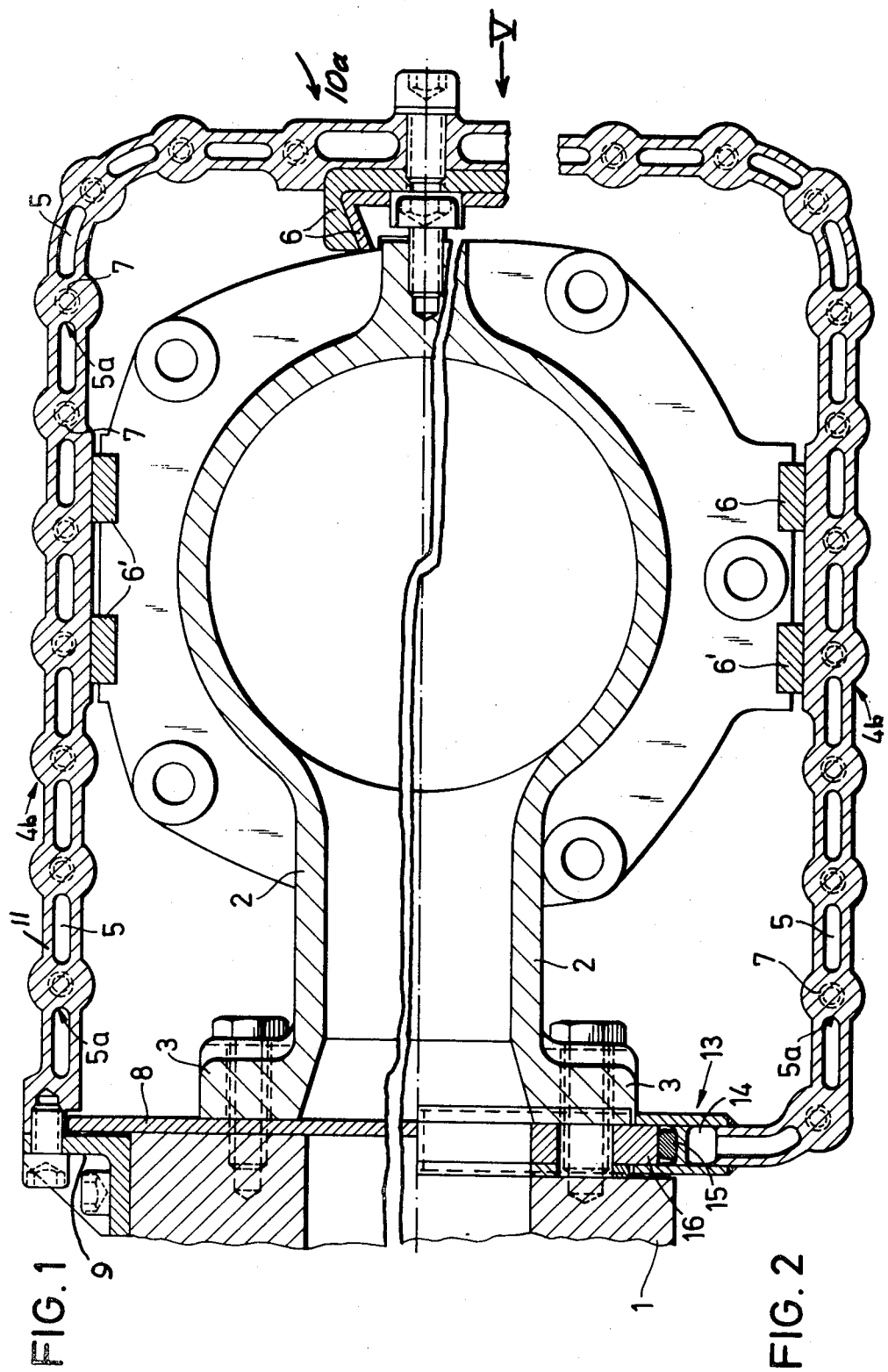

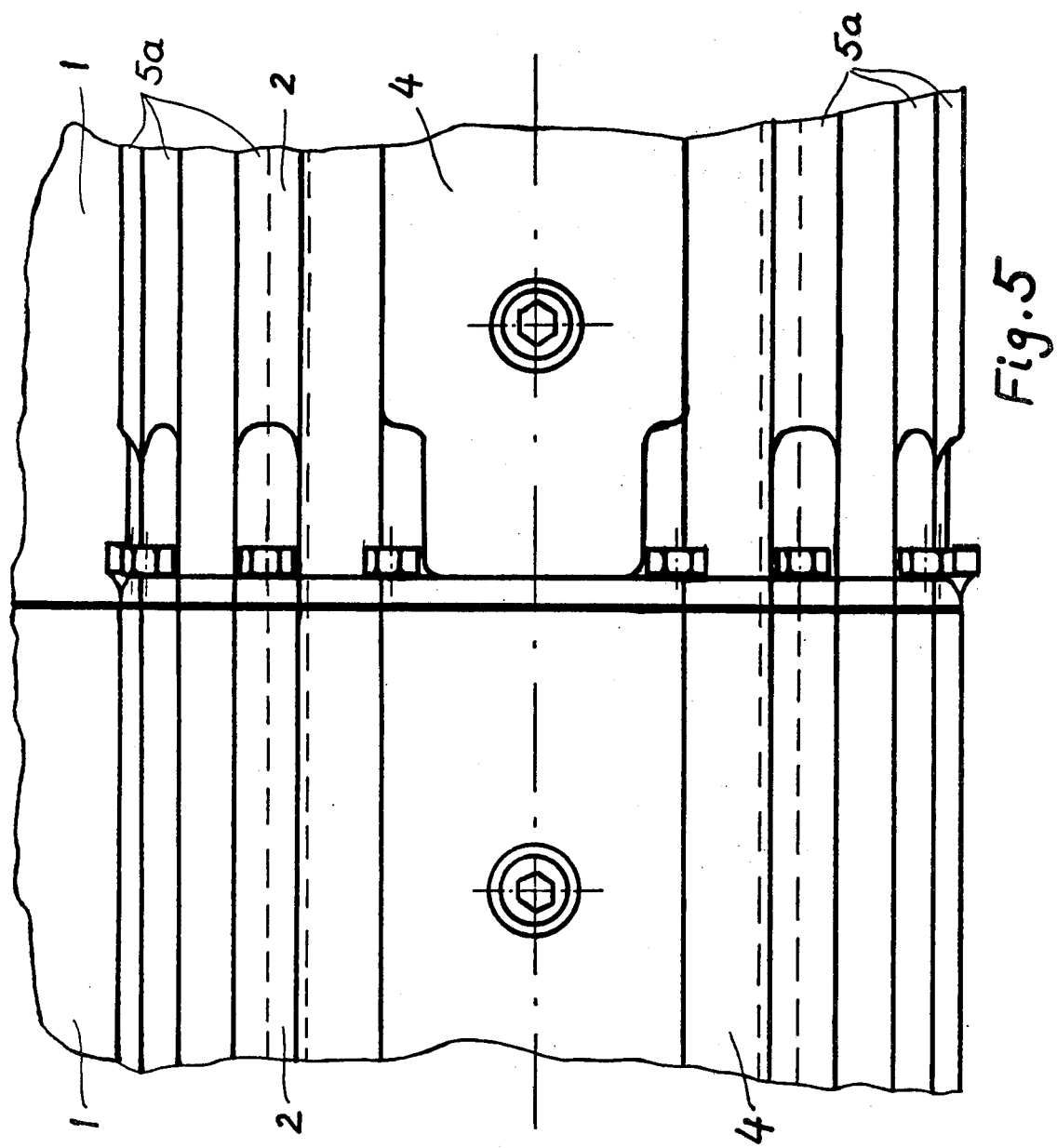

EXHAUST GAS CONDUIT SYSTEM FOR MULTI-CYLINDER RECIPROCATING PISTON INTERNAL COMBUSTION ENGINES

This is a divisional application of co-pending application Ser. No. 948,438 filed Oct. 4, 1978, now U.S. Pat. No. 4,273,080 issued June 16, 1980.

The present invention relates to an exhaust gas conduit system for multi-cylinder reciprocable internal combustion engines with at least one cylinder row, in which the exhaust gas conduit is connected by means of flanges joined to exhaust gas passages of the cylinder head or of the cylinder heads and is surrounded by a water-cooled insulating wall, and in which between the exhaust gas conduit and the insulating wall there are provided supporting points.

An exhaust gas conduit system of the above mentioned general type has become known according to which the water-cooled insulating wall forms the support proper for the exhaust gas conduit and, by means of water-cooled connections forming one piece with the insulating wall, is connected to the cylinder heads. The exhaust gas conduit is braced within the tubular insulating wall and is held by the latter. This exhaust gas conduit system is, however, complicated in construction, is very expensive and heavy because the insulating wall has to be made of cast iron. Furthermore, the insulating wall is connected positively by said mentioned connections to the cooling circuit of the internal combustion engine. As a result thereof, the temperature of the insulating wall is always dependent on the temperature of the internal combustion engine and cannot be reduced at will.

It is, therefore, an object of the present invention to provide an exhaust gas conduit system which will overcome the above mentioned drawbacks and which will be simple in construction and which can be more economically produced.

This object and other objects and advantages of the invention will appear more clearly from the following specification in connection with the accompanying drawings, in which:

FIG. 1 is a partial cross section through an exhaust gas conduit system according to the invention with partial section through the adjacent cylinder head.

FIG. 2 is a partial cross section through the exhaust gas conduit system of FIG. 1 in which, however, the connection within the region of the cylinder head has been modified.

FIG. 5 is a side view of the exhaust gas manifold system in the direction of arrow V in FIG. 1.

Figure 3:
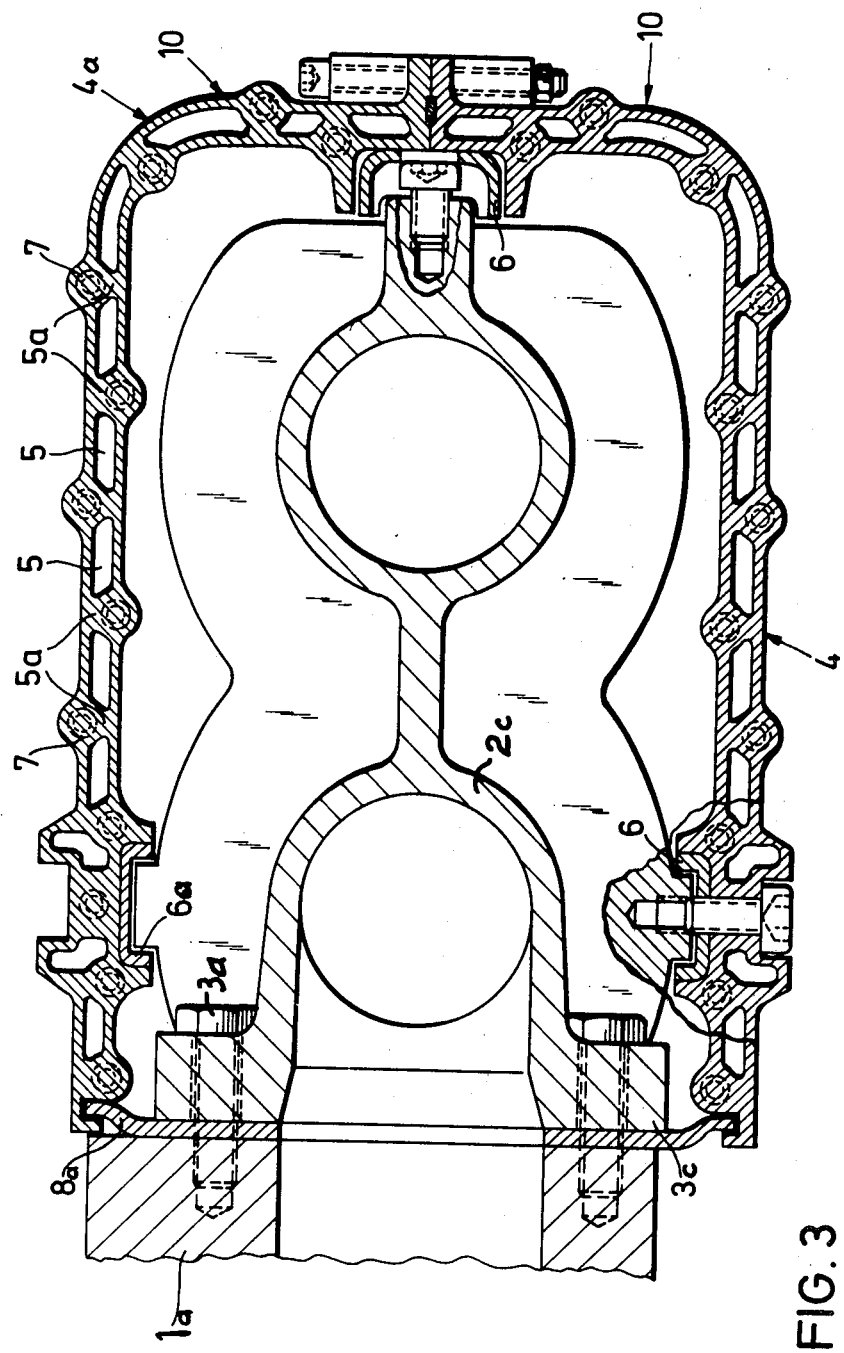
FIG. 3 represents a cross section through an exhaust gas conduit system according to FIG. 1, in which the insulating wall is composed of two bowl-shaped profiles.

The exhaust gas conduit system according to the invention is characterized primarily in that the insulating wall comprises longitudinal water chambers extending along the exhaust gas conduit, while these water chambers are formed by the walls of the insulating wall and the ribs supporting or bracing the latter. The dividing-up of the insulating wall into longitudinal water chambers has the particular advantage that the cooling water is being guided precisely whereby a highly satisfactory cooling of the insulating wall is made possible which is uniformly distributed over the entire circumference of the insulating wall. Furthermore, this way of conveying the water makes it possible to cool the insulating wall separately from the remaining parts of the internal combustion engine, while also considerably lower temperatures than that of the cooling water of the internal combustion engine can be realized.

By dividing-up the insulating wall into longitudinal water chambers, it is possible to produce the insulating wall and its profiles in a continuous process, for instance as extrusion members, of light metal, whereby a wall can be obtained which is particularly economical. This design also makes it possible to produce the insulating wall or walls of thin-walled metallic cover sheets with rectangular profiles which extend parallel to each other and which can be interconnected, preferably by hard soldering in a continuous heating furnace or in a pusher type furnace. The thus obtained insulating walls or profiles of any desired length can be extended by means of welded-on or screwed-on connecting flanges or they can be closed by closing covers or lids. In this connection, the screws are inserted into the rectangular profiles or in reinforcements of the ribs when the structure is made of light metal.

In order to be able to use also raw water, i.e. non-purified and non-filtered water, as it is available in the form of river or sea water, for cooling the insulating wall, all passages may be widened to such an extent that no clogging up can occur, especially with regard to the raw water referred to above. A particularly wear resistant insulating wall is obtained when employing metallic cover sheets alloyed with copper and nickel.

Referring now to the drawings in detail, in FIGS. 1–4 there is shown a cylinder head 1 which is only partially illustrated to show its connection with the exhaust gas conduit. The cylinder head 1 is followed by an exhaust gas conduit 2 which by means of flanges 3 is connected to the cylinder head 1. Around the exhaust gas conduit 2 there is provided an insulating wall generally designated with the reference numeral 4, which prevents any direct contact with the exhaust gas conduit. The insulating wall 4 comprises longitudinal water chambers 5 which extend along the entire insulating wall or along the sections of the insulating wall arranged one behind the other and which are passed through by the cooling water. The longitudinal water chambers 5 are separated from each other by ribs 5a. In the region of the lateral surfaces of the insulating wall 4 and on the upper and lower sides there are provided intermediate members 6, 6' which may be screwed thereto and which permit to support or brace the insulating wall and the exhaust gas conduit 2 relative to each other while simultaneously, however, permitting a displacement.

The insulating wall 4 according to FIG. 1 is made as a single piece and surrounds the exhaust gas conduit 2 in a U-shaped manner. To obtain an economical manufacturing process, the wall 4 is made as a cast or extruded member of light metal while, depending on the respective motor, a plurality of sections may be arranged one behind the other. These sections are interconnected by non-illustrated connecting flanges. These connecting flanges are connected by screws joined to the insulating wall, the screws being located in the screw receiving parts 7. The screw receiving parts 7 are provided in the ribs 5a which separate the water chambers 5 from each other. Between the flanges 3 of the exhaust gas conduit 2 and the cylinder head 1 there is connected a sealing element 8 having an end region thereof substantially parallel to an angle profile 9 which is connected to the cylinder head 1. This end region also serves as connection for the insulating wall 4. The connecting screw for the intermediate member 6 of the lateral surface is likewise arranged in a rib 5a of the insulating wall 4.

The exhaust gas conduit system illustrated in FIG. 3 essentially corresponds to that of FIG. 1, and similar parts have been designated with the same reference numerals as in FIG. 1 but with the additional letter character "a". The essential difference between FIGS. 1 and 3 consists in that the insulating wall 4a consists of two bowl-shaped profiles 10 which are screwed to each other in the region of the lateral surface. In the vicinity of the cylinder head 1a, the bowl-shaped profiles 10 are interconnected or hooked together with the sealing element 8a. This is possible because the bowl-shaped profiles 10 are connected also in the region of the upper and lower intermediate members 6a joined to the exhaust gas conduit 2. In contrast to the embodiment of FIG. 1, the ribs 5a of the bowl-shaped profiles of FIG. 3 have outwardly extending extensions of the ribs which results in an increased rigidity of the profiles. In this connection, the ribs 5a are alternately extended inwardly and outwardly beyond the wall, while the screw supporting sections 7a are correspondingly offset with respect to FIG. 1.

Figure 4:
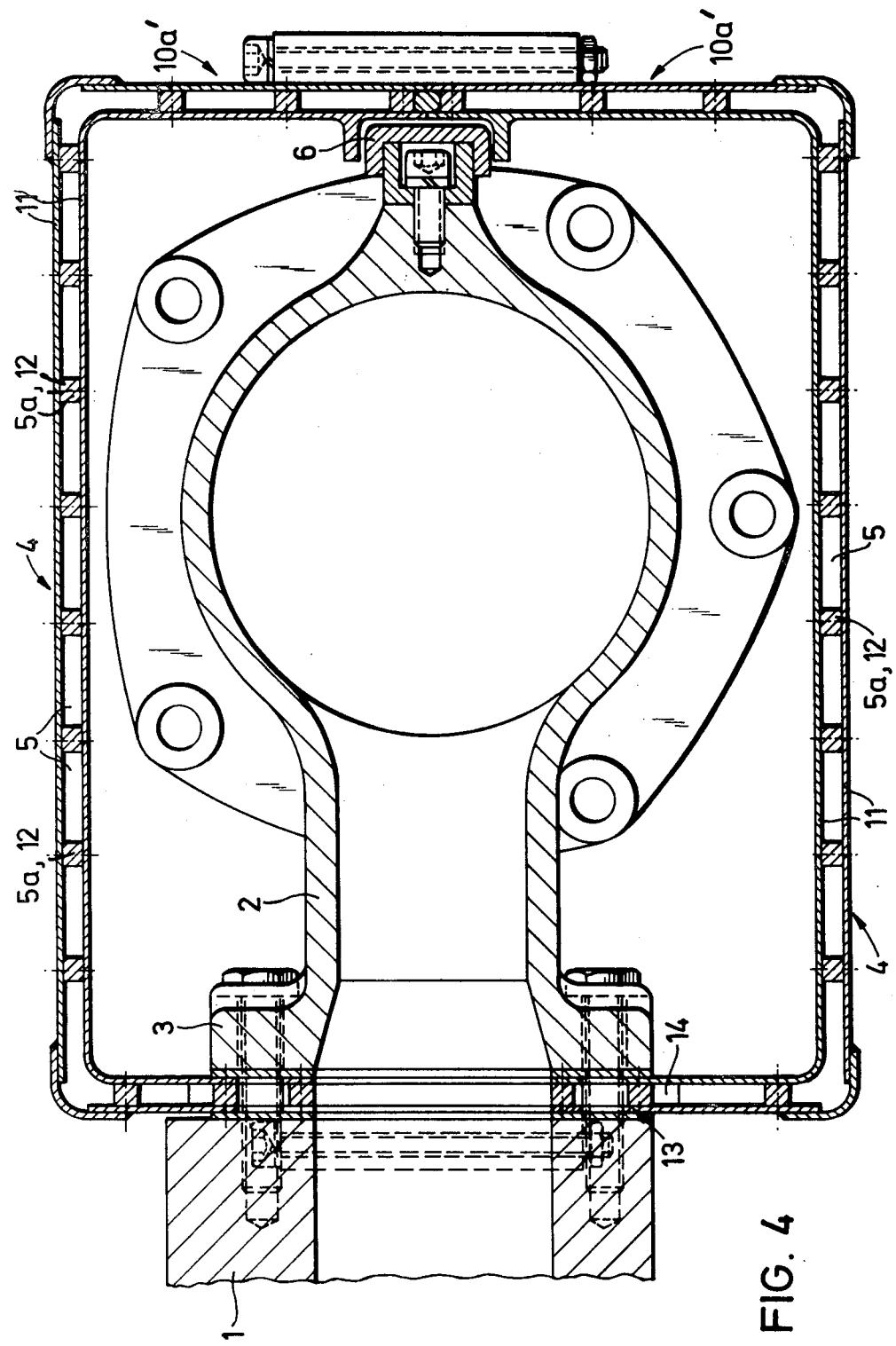
FIG. 4 represents a cross section through an exhaust gas conduit system in which the insulating wall is made from metallic cover sheets with interposed rectangular profiles and comprises two bowl-shaped profiles.

In connection with the exhaust gas conduit system according to FIGS. 2 and 4, in which the insulating walls are designed in a similar manner, the following description applies to these two figures. The difference consists in that the insulating wall 4b of FIG. 2, which is divided into the bowl-shaped profiles 10a, is made of extrusion parts of light metal in conformity with the embodiments of FIGS. 1 and 3, whereas the bowl-shaped profiles 10a' according to FIG. 4 are made of thin-walled metallic cover sheets 11 having inner rectangular profiles 12. The cover sheets are hard soldered to the rectangular profiles in a continuous heating furnace or pusher type furnace. The profiles 10 are, in conformity with the previous embodiments, screwed to each other and through one or more intermediate members 6' rest against the exhaust gas conduit, 2c. In the region of the flanges 3c of the exhaust gas conduit, the bowl-shaped profiles 10a are provided with mechanically produced recesses into which the inserts 13 are welded or soldered. The inserts 13 together with the insulating wall 4 form an annular water chamber 14 through which the interrupted longitudinal water chambers 5 are connected to each other. On the inside, the inserts 13 via the intervention of an O-ring 15 (FIG. 2) are supported by a spacer ring 16 which is braced between the flanges 3 and the cylinder head 1.

FIG. 5 provides a side view of the exhaust manifold or conduit system according to a view taken in the direction of an arrow V as marked in FIG. 1. In this illustration there are shown basically only the reference numerals mentioned in the previous description.

It is, of course, to be understood that the present invention is, by no means, limited to the specific showing in the drawings but also encompasses any modifications within the scope of the appended claims.

What I claim is:

1. An exhaust gas conduit system for a multi-cylinder reciprocable piston internal combustion engine having its cylinders arranged in at least one cylinder row and respectively provided with a cylinder head and an exhaust gas conduit, in which said exhaust gas conduit respectively establishes communication between the respective cylinder and the pertaining cylinder head, and which includes water cooled insulating walls respectively surrounding said exhaust gas conduit as well as having water chambers therewith and extending in the longitudinal direction thereof and being formed by water chamber forming wall sections of said insulating walls and by ribs supporting said water chamber forming wall sections relative to each other, said insulating walls at their connecting area with the respective exhaust gas conduit being provided with recesses having inserts sealingly connected thereto, and said exhaust gas conduit being connected to the pertaining cylinder head by flanges having recesses therein, said inserts on the one hand forming with the respective insulating walls an annular water chamber interconnecting the pertaining longitudinal water chambers and on the other hand being guided in the recesses of said flanges while there is interposed therebetween an elastic heat resistant layer.

2. An exhaust gas conduit system according to claim 1 with said insulating walls being composed of a plurality of dish-shaped profiles having dividing planes substantially parallel to said longitudinal water chambers and interconnected at said dividing planes.

3. An exhaust gas conduit system according to claim 2, in which said profiles are thin-walled cover metal sheets with inner interconnected rectangular profiles extending substantially parallel to each other.

4. An exhaust gas conduit system according to claim 3, in which said thin-walled cover sheets and said rectangular profiles are of raw water resistant material.

5. An exhaust gas conduit system according to claim 3, in which said thin-walled cover metal sheets are of Cu-Ni30Fe material.

* * * * *